Jan. 22, 1957     W. V. EVANS     2,778,183
LAWN MOWER TRIMMER ATTACHMENT

Filed Nov. 24, 1953     2 Sheets-Sheet 1

William V. Evans
INVENTOR.

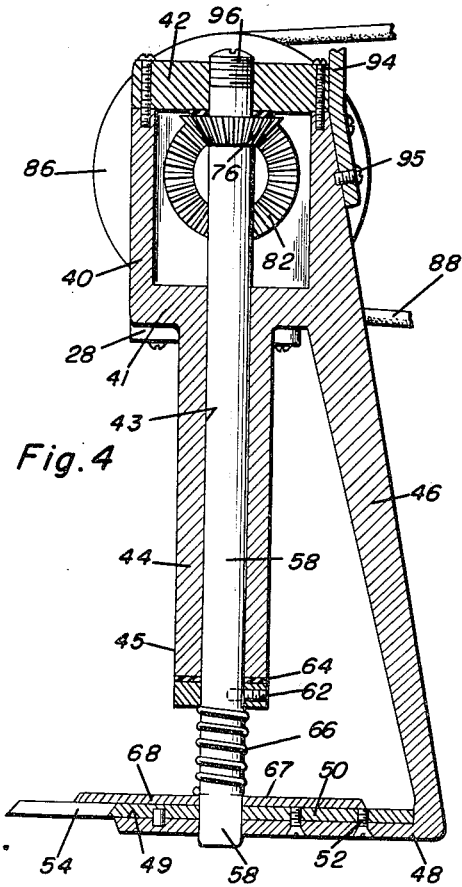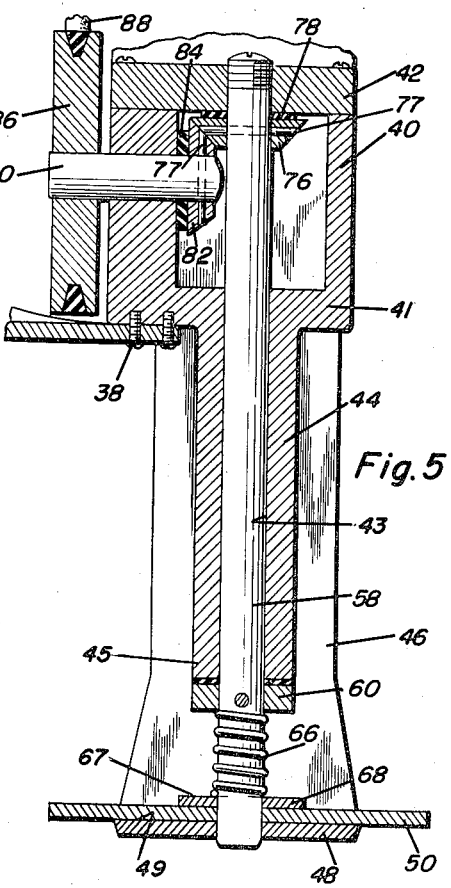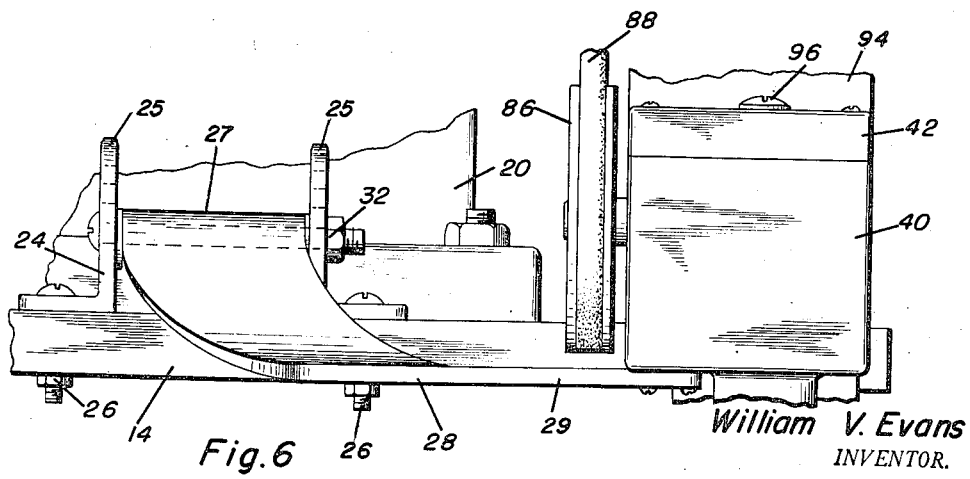

United States Patent Office 2,778,183
Patented Jan. 22, 1957

2,778,183

LAWN MOWER TRIMMER ATTACHMENT

William V. Evans, Redondo Beach, Calif.

Application November 24, 1953, Serial No. 394,019

1 Claim. (Cl. 56—25.4)

This invention relates to a lawn mower trimmer attachment for a power driven lawn mower, and has for its primary object to enable a lawn mower to uniformly and easily trim or cut the edge of a lawn along fences, walls, trees and other objects.

Another important object of this invention is to provide an edge trimming attachment for a lawn mower which is easily and conveniently secured to a standard power lawn mower or the like and which may be conveniently raised to an inoperative position or lowered to an operative cutting position.

A further important object of this invention is to provide a trimmer attachment for lawn mowers which may be easily adjusted vertically to vary the cutting height of the attachment.

These and ancillary objects and structural features of merit are attained by this invention, preferred embodiments of which are set forth in the following description and illustrated in the accompanying drawings, wherein:

Figure 4 is an enlarged longitudinal, vertical section taken substantially along the section line 4—4 of Figure 1;

Figure 5 is an enlarged longitudinal, vertical section similar to Figure 4 and taken at right angles to the plane of Figure 4 showing details of the drive means for the lawn trimmer attachment; and Figure 6 is an enlarged front elevational detail showing the mounting bracket and vertical adjustment thereon.

Figure 1:
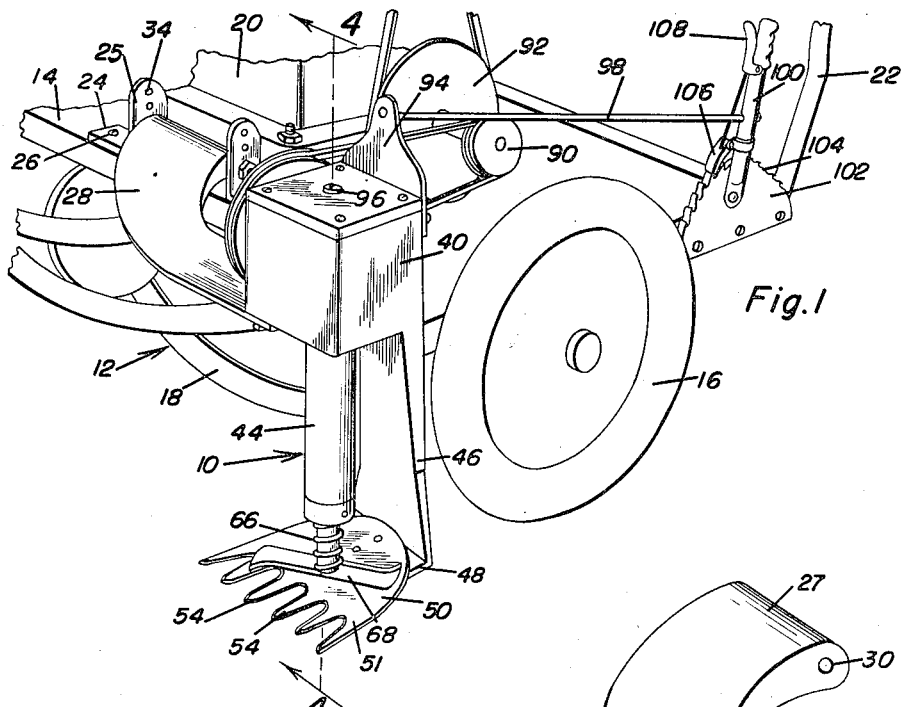
Figure 1 is a perspective view showing the trimmer attachment of this invention secured to a conventional reel type lawn mower.
Figure 3:
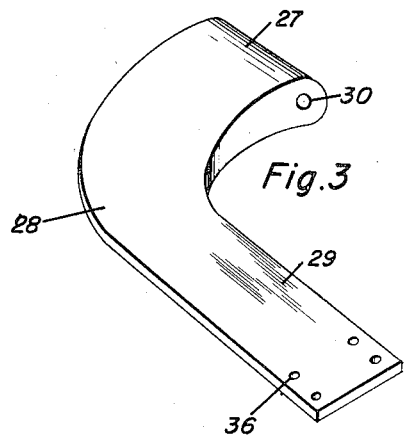
Figure 3 is an enlarged perspective detail view of the angulated support member for securing the attachment to the frame of a power lawn mower.

Referring now specifically to Figure 1 of the drawings, it will be seen that the numeral 10 generally indicates the trimmer attachment for the power lawn mower generally indicated by the numeral 12 having a frame 14, ground engaging wheels 16, a rotatable reel 18, a power source 20 mounted on the frame 14 and a suitable guide handle 22 for guiding and operating the power lawn mower 12.

Figure 2:
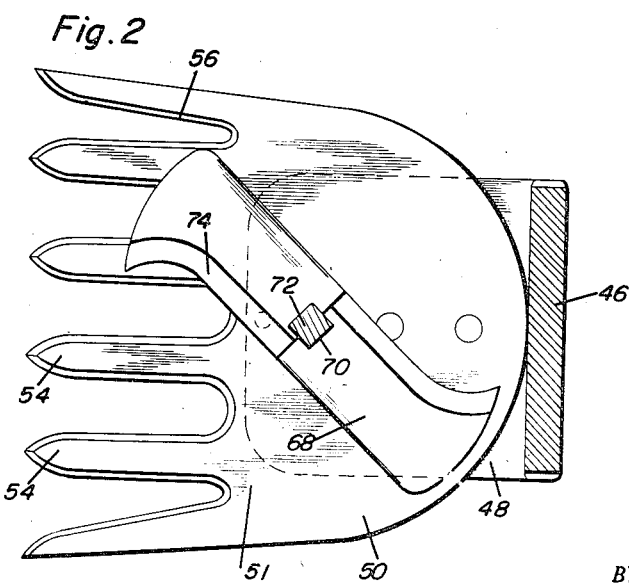
Figure 2 is an enlarged top plan section taken above the cutting element showing details of the cutter and guide fingers.

As shown in Figure 6, a pair of right angular brackets 24 are secured in spaced relation to the frame 14 by suitable bolts 26. A right angular supporting bracket 28 having a transverse bore 30 in one end 27 is secured between the upstanding legs 25 of the bracket 24 by a suitable pivot bolt 32. It will be seen that the upstanding legs 25 of the bracket 24 have spaced and aligned apertures 34 for vertically adjustably receiving the pivot bolt 32 wherein the right angular supporting bracket 28 may be adjusted in relation to the frame 14. The other end 29 of the right angular supporting bracket 28 includes a plurality of apertures 36 for receiving fastening members 38 which secure the bracket 28 to a casing 40 which is hollow and generally rectangular in shape and including a removable top cover 42 and a lower wall 41. A tubular shaft housing 44 is integral with and extends downwardly from the lower wall 41 of the casing 40 and includes a longitudinal bore 43 in communication with the hollow portion of the casing 40. One side of the casing 40 includes a downwardly projecting bracket 46 having a right angular bottom portion 48 which projects forwardly under the shaft housing 44 in spaced relation. A cutter plate 50 is secured to the upper surface 49 of the right angular cutter bottom portion or lower end 48 by suitable fastening means 52 and the forward portion 51 of said plate 50 includes a plurality of projecting guide fingers 54 which are generally sharpened around their edges, as indicated by the numeral 56 in Figure 2. A shaft 58 is journaled in the shaft housing 44 and projects upwardly through the casing 40 into the cover 42 and downwardly through the plate 50 and the right angular lower end 48. A thrust collar 60 is secured to the shaft 58 by a set screw 62 for engaging a coil spring 66. A thrust washer 64 is positioned between collar 60 and the lower end 45 of the housing 44. The coil compression spring 66 is positioned around the shaft and abuts the thrust collar 60 at one end with the other end abutting the upper surface 67 of a cutter bar 68 having a polygonal opening 70 therein for slidably receiving a polygonal portion 72 of the shaft 58. The cutter bar 68 includes sharpened edges 74 for cooperation with the sharpened edges 56 on the fingers 54 for cutting grass or the like. It will be seen that a bevel gear 76 is secured to the upper end of the shaft 58 and a thrust washer 78 is positioned on the upper surface of the bevel gear 76 for engaging the undersurface of the cover 42 of the casing 40 wherein the shaft 58 is held in longitudinal position. A stub shaft 80 is rotatably journaled in a side of the casing 40 at right angles to the shaft 58 and projecting inwardly of the lawn mower 12. The stub shaft 80 has a bevel gear 82 on its inner end in meshing engagement with the bevel gear 76 and a thrust washer 84 orientates the gear 82 in correct meshing engagement with the gear 76. The gears 76 and 82 are secured on shafts 58 and 80 by transverse pins 77. A V-belt pulley 86 is secured to the outer end of the stub shaft 80 for receiving an endless V-belt 88 thereover. The V-belt 88 passes over a driving pulley 90 which is rigidly secured to another pulley 92 for transmitting power from the power source 20 to the trimming attachment 10. An upstanding lug 94 is secured to the rear portion of the casing 40 by screw threaded fasteners 95 and a screw threaded plug 96 is removably positioned in the center of the closure 42 of the casing 40 for admitting lubrication to the interior of the casing 40. A connecting link 98 is secured to the upper end of the lug 94 at one end, and its other end is secured adjacent the midportion of a hand lever 100 which is pivotally secured to a semi-circular member 102 adjacent its center point. The semi-circular member 102 has ratchet teeth 104 thereon and the hand lever 100 has a releasable spring urged pawl 106 thereon for engaging the teeth 104. A squeeze handle 108 permits the pawl 106 to be disengaged from the ratchet teeth 104 wherein the trimmer attachment may be pivotally adjusted about a horizontal axis formed by the pivot bolt 32.

From the foregoing construction, the operation of the device will be readily understood. The attachment 10 is secured to the frame 14 of the lawn mower 12 by the pivot bolt 32 in vertically adjusted position by selective engagement of the bolt 32 with the vertically arranged apertures 34 in the bracket 24. The device may be easily pivoted to an operative or an inoperative position by manipulation of the hand lever 100, and manipulation of the squeeze member 108 wherein the casing 40 and the attachment 10 may be pivoted about the horizontal axis formed by the bolt 32. This pivoting about the bolt 32 changes the relative distance between the pulleys 86 and 90 wherein the belt 88 is slack, thereby transmitting no power to the attachment 10 when in its inoperative position. When in its operative position, the power transmitted rotates the stub axle 80, gear 82, gear 76, shaft 58 and cutter bar 68. As the bar 68 rotates, material guided into their path by the sharpened guide fingers 54 is cut or chopped as desired. It will be understood that the spring 66 maintains the cutter bar 68 in engagement with the upper surface of the plate 50 and, of course, the spring 66 permits some slight movement of the blade 68, thereby preventing breakage of the blade 68. Obviously, the device may be attached to any conventional lawn mower and constructed of readily obtainable materials meeting the requirements of this particular device. Obviously, the trimmer attachment may be manufactured for application to either side of a mower and may be adapted for use with all types of mowers.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A trimmer adapted to be mounted on a power mower of the type having a wheeled frame and a power shaft, said trimmer comprising a hollow casing having a lower wall adapted to be mounted on the frame of the mower in a vertical operative position, a depending tubular shaft housing integral with the lower wall of the housing and terminating in a lower end, a vertical shaft journaled in said shaft housing and having an upper end extending into the hollow casing and having a lower end projecting longitudinally from the lower end of the shaft housing, a gear secured to the upper end of the shaft and being disposed within the casing, a horizontal stub shaft extending into said casing and terminating in an inner end within the casing and a outer end disposed exteriorly of the casing, a gear mounted on the inner end of the horizontal shaft in meshing engagement with the gear on the upper end of the vertical shaft, a pulley on the outer end of the horizontal shaft and adapted to receive rotative power from the power shaft of the power mower, a depending bracket on said casing terminating in a lower end extending perpendicularly and in substantially parallel relation to the lower wall of the casing and in spaced relation to the lower end of the shaft housing, a cutter plate mounted on the upper surface of the lower end of the bracket, said cutter plate having a plurality of projecting fingers in the same plane as the plate with the fingers having sharpened edges disposed in spaced relation, said vertical shaft having a cutter bar slidably mounted on the lower end thereof, said shaft having the lower end non-rotatively received in an opening in said cutter bar, said cutter bar having sharpened edges and rotatably engaging the upper surface of the cutter plate for cutting coaction with the sharpened fingers, and a coil spring encircling the lower end of the shaft with one end disposed against the cutter bar and the other end terminating adjacent the lower end of the shaft housing, a thrust collar on said shaft in engagement with the lower end of the shaft housing and the other end of the spring thereby resiliently retaining the cutter bar against the cutter plate.

References Cited in the file of this patent

UNITED STATES PATENTS

| | | |
|---|---|---|
| 2,193,712 | Campbell | Mar. 12, 1940 |
| 2,435,192 | Arsneau | Feb. 3, 1948 |
| 2,478,587 | La Bonte | Aug. 9, 1949 |
| 2,483,683 | Wells et al. | Oct. 4, 1949 |
| 2,496,327 | Beck | Feb. 7, 1950 |
| 2,618,919 | Hutchens | Nov. 25, 1952 |
| 2,632,990 | Stricklen et al. | Mar. 31, 1953 |
| 2,653,381 | Rooke | Sept. 29, 1953 |
| 2,663,137 | Asbury | Dec. 22, 1953 |
| 2,664,925 | Jacobs et al. | Jan. 5, 1954 |
| 2,666,287 | Atteberry | Jan. 19, 1954 |
| 2,676,447 | Asbury | Apr. 27, 1954 |
| 2,719,400 | Lesesne | Oct. 4, 1955 |
| 2,721,432 | Machovec | Oct. 25, 1955 |